US009550263B2

United States Patent
Ryai, Sr. et al.

(10) Patent No.: US 9,550,263 B2
(45) Date of Patent: Jan. 24, 2017

(54) KEY CUTTING MACHINE

(71) Applicant: Hy-Ko Products Company, Inc., Northfield, OH (US)

(72) Inventors: Richard W. Ryai, Sr., North Royalton, OH (US); Michael A. Bass, Chagrin Falls, OH (US)

(73) Assignee: Hy-Ko Products Company, Inc., Northfield, OH (US)

( * ) Notice: Subject to any disclaimer, the term of this patent is extended or adjusted under 35 U.S.C. 154(b) by 81 days.

(21) Appl. No.: 14/310,729

(22) Filed: Jun. 20, 2014

(65) Prior Publication Data

US 2014/0321935 A1     Oct. 30, 2014

Related U.S. Application Data

(63) Continuation of application No. 13/647,006, filed on Oct. 8, 2012, now Pat. No. 8,784,020, and a (Continued)

(51) Int. Cl.
*B23C 3/35* (2006.01)
*B23Q 11/08* (2006.01)
*B23Q 11/00* (2006.01)

(52) U.S. Cl.
CPC ............ *B23Q 11/005* (2013.01); *B23C 3/35* (2013.01); *B23Q 11/0046* (2013.01); *B23Q 11/0075* (2013.01); *B23Q 11/08* (2013.01); *B23C 2230/08* (2013.01); *B23C 2235/00* (2013.01); *Y02P 70/171* (2015.11); *Y10T 409/30392* (2015.01); *Y10T 409/300952* (2015.01);
(Continued)

(58) Field of Classification Search
CPC ....... B23C 3/35; B23C 3/355; B23Q 11/0075; Y10T 409/300952; Y10T 409/301008; Y10T 409/301064; Y10T 409/30392; Y10T 409/304088; Y10T 409/303976; Y10T 409/304032
USPC .... 409/81–83, 134, 137, 135–136, 225, 168
See application file for complete search history.

(56) References Cited

U.S. PATENT DOCUMENTS

| 2,645,978 A | 7/1953 | Sejarto et al. |
| 2,929,177 A | 3/1960 | Sheps |
(Continued)

FOREIGN PATENT DOCUMENTS

| DE | 935702 | 11/1955 |
| DE | 19651662 | 6/1998 |
(Continued)

OTHER PUBLICATIONS

International Search Report and Written Opinion for International Patent Application No. PCT/US2004/034947, mailed Feb. 22, 2005.
(Continued)

*Primary Examiner* — Erica E Cadugan
(74) *Attorney, Agent, or Firm* — McDonald Hopkins LLC

(57) ABSTRACT

A key cutting machine includes a housing, carriage, key clamp, and motor to drive the carriage. The key cutting machine may include a vacuum removably attached to the housing. The key cutting machine may be selected between manual, automatic, and semi-automatic user modes. Additional improvements or features of a key cutting machine are also described.

13 Claims, 10 Drawing Sheets

Related U.S. Application Data continuation of application No. 12/383,825, filed on Mar. 27, 2009, now Pat. No. 8,292,556, and a continuation of application No. 11/728,174, filed on Mar. 23, 2007, now Pat. No. 7,527,458, and a continuation of application No. 10/970,844, filed on Oct. 20, 2004, now Pat. No. 7,214,011.

(60) Provisional application No. 60/512,636, filed on Oct. 20, 2003.

(52) U.S. Cl.
CPC .......... *Y10T 409/301008* (2015.01); *Y10T 409/301064* (2015.01); *Y10T 409/304088* (2015.01); *Y10T 409/305544* (2015.01)

(56) References Cited

U.S. PATENT DOCUMENTS

| | | | |
|---|---|---|---|
| 3,625,111 A | | 12/1971 | Carlo et al. |
| 3,682,041 A | | 8/1972 | Essig |
| 3,773,360 A | | 11/1973 | Timbers |
| 3,880,047 A | | 4/1975 | Dosier |
| 4,023,464 A | * | 5/1977 | Zion .............. B23C 3/355 409/83 |
| 4,541,760 A | | 9/1985 | Zoueki |
| 4,697,300 A | | 10/1987 | Warlop |
| 5,171,112 A | | 12/1992 | Roland |
| 5,172,464 A | * | 12/1992 | Kitamura .......... B23Q 1/5406 198/346.1 |
| 5,259,708 A | | 11/1993 | Brice |
| 5,271,698 A | | 12/1993 | Heredia et al. |
| 5,538,374 A | | 7/1996 | Cole et al. |
| 5,660,509 A | | 8/1997 | Cole et al. |
| 5,984,597 A | | 11/1999 | Chen |
| 6,064,747 A | | 5/2000 | Wills et al. |
| 6,179,531 B1 | | 1/2001 | Jaw |
| 6,220,799 B1 | | 4/2001 | Okutani et al. |
| 6,602,030 B1 | | 8/2003 | Markbreit |
| 7,172,498 B2 | | 2/2007 | Bernard et al. |
| 7,214,011 B2 | | 5/2007 | Ryai, Sr. et al. |
| 7,527,458 B2 | | 5/2009 | Ryai, Sr. et al. |
| 8,292,556 B2 | | 10/2012 | Ryai, Sr. et al. |
| 2002/0168241 A1 | | 11/2002 | David et al. |
| 2004/0095380 A1 | | 5/2004 | Bass et al. |
| 2005/0000052 A1 | | 1/2005 | Byles |
| 2006/0003676 A1 | | 1/2006 | Bernard et al. |

FOREIGN PATENT DOCUMENTS

| | | |
|---|---|---|
| DE | 19734628 | 2/1999 |
| WO | 0200390 | 1/2002 |
| WO | 2005042196 | 5/2005 |

OTHER PUBLICATIONS

Supplemental European Search Report for European Patent Application No. 04796014.1, dated Feb. 29, 2012.

European Office Action for European Patent Application No. 04796014.1, dated Oct. 4, 2013.

International Preliminary Report for International Patent Application No. PCT/US04/34947, mailed May 4, 2006.

Dictionary definition of "motor"; Merriam-Webster's Collegiate Dictionary, 10th ed., p. 760, copyright 1998.

\* cited by examiner

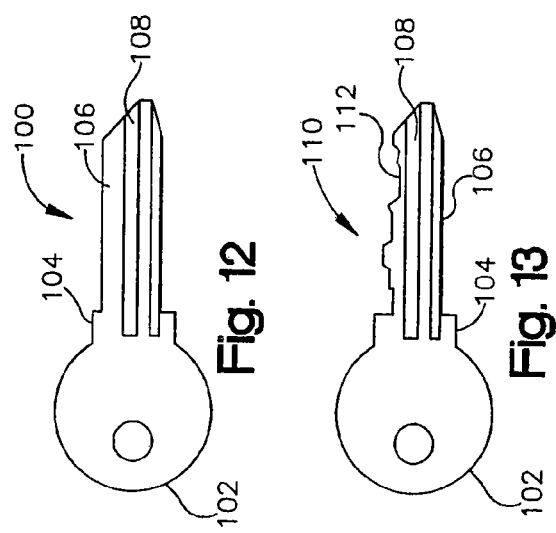
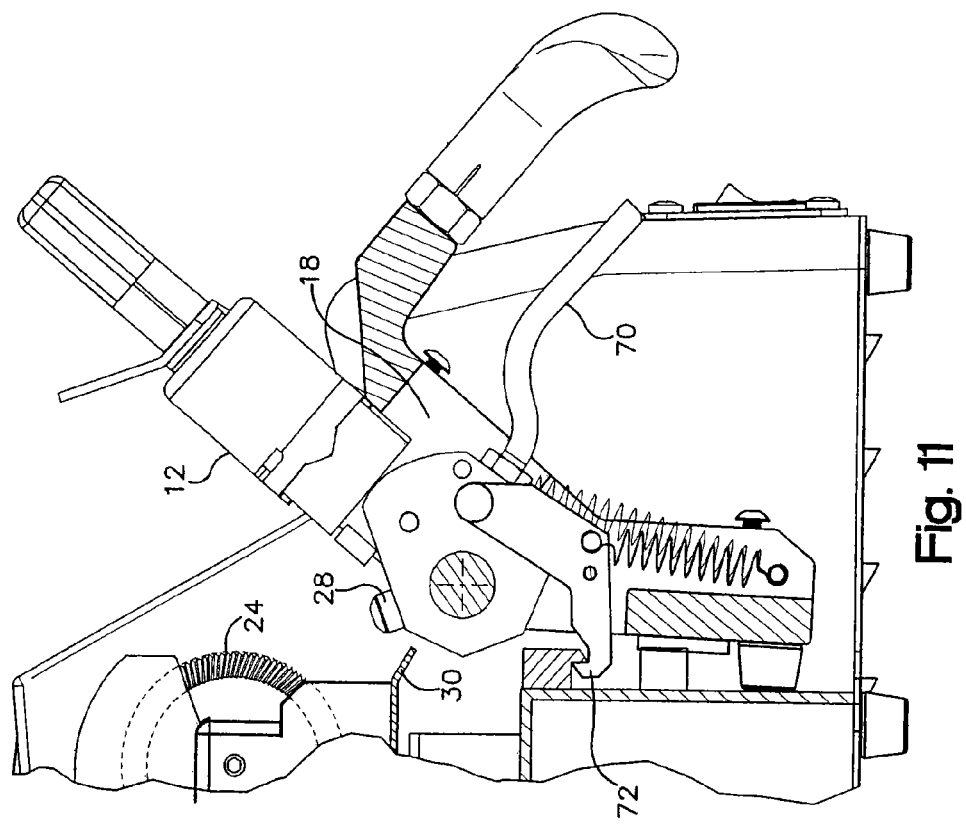

KEY CUTTING MACHINE

CROSS-REFERENCE TO RELATED APPLICATION

This application is a continuation of U.S. patent application Ser. No. 13/647,006, now U.S. Pat. No. 8,784,020 to Ryai et al. filed on Oct. 8, 2012, and titled KEY CUTTING MACHINE, which is a continuation of U.S. patent application Ser. No. 12/383,825, now U.S. Pat. No. 8,292,556, to Ryai et al. filed on Mar. 27, 2009, and titled KEY CUTTING MACHINE, which is a continuation of U.S. patent application Ser. No. 11/728,174, now U.S. Pat. No. 7,527,458, to Ryai et al. filed on Mar. 23, 2007, and titled KEY CUTTING MACHINE, which is a continuation of U.S. patent application Ser. No. 10/970,844, now U.S. Pat. No. 7,214,011, to Ryai et al. filed on Oct. 20, 2004 and titled KEY CUTTING MACHINE, which claims priority from U.S. Provisional Patent Application No. 60/512,636 to Ryai et al. filed on Oct. 20, 2003, and titled KEY CUTTING MACHINE, all of which are hereby incorporated in their entirety by reference.

BACKGROUND

The present invention relates to key cutting machines that duplicate and cut the key pattern from a master key on to a key blank and, more particularly, to key cutting machines having features for improved performance and ease of operation.

Key cutting machines typically comprise a pair of vise grips or clamps mounted on a carriage. A master key having a keyway groove or grooves if necessary and a key pattern already cut therein is placed in one of the vise grips or clamps on the carriage and a key blank awaiting to be cut having an identical keyway groove or grooves as necessary is placed in the adjacent vise grip or clamp on the carriage. The key pattern of the master key faces a stylus or tracer bar on the key cutting machine and the key blank faces a cutting wheel. The carriage is pivotally and linearly movable along a longitudinal supporting shaft and presses the key pattern of the master key against the tracer bar and the key blank against the cutting wheel. The carriage is then manually shifted longitudinally along supporting shaft thereby causing the key pattern on the master key to travel on the tracer bar and impart corresponding pivotal movement to the carriage so that the cutting wheel cuts the identical key pattern into the corresponding key blank. The key blank cut with the master key pattern is then removed from the vise or grip and buffed on a buffing wheel to remove any burrs.

While the above-identified description is directed to manual key cutting machines (machines in which the motion of the carriage results directly from user manipulation), there are also similar automatic key cutting machines. Such automatic key cutting machines can have a similar structure, but the carriage moves during the key cutting operation as driven by the motor of the key cutting machine.

Further, regardless of the particular operational characteristics of a key cutting machine, metal shavings result from the cutting wheel cutting a key pattern into a key blank. These metal shavings can accumulate if the key cutting machine is not cleaned on a regular basis and most advantageously after each key cutting operation. These metal shavings can fall into the housing of the key cutting machine and disrupt the operation of the machine or cause injury to the operator as they are very sharp and can cut an operator attempting to operate the key cutting machine.

It is an object of the present invention to provide a key cutting machine that can be operated in three different modes; automatic, semi-automatic, and manual.

It is a further object of the present invention to provide a key cutting machine that is adaptable to utilize a vacuum system for removing metal shavings from the cutter area.

Yet another object of the present invention is to provide a key cutting machine having all motors and working parts mounted to the underside of the housing away from any metal shavings and dirt which gather below.

Yet another object of the present invention is to provide a computer interface so that the key cutting machine may be operated according to instructions from a Key I.D. system (as described in U.S. patent application Ser. No. 10/633,933, now U.S. Pat. No. 7,890,878, filed on Aug. 4, 2003, herein incorporated by reference herein) or automatic feeder system.

DESCRIPTION OF THE DRAWINGS

Objects and advantages together with the operation of the invention may be better understood by reference to the following detailed description taken in connection with the following illustrations, wherein:

FIG. 11 is a cross-sectional view of the carriage locked in a carriage-down position.

FIG. 12 is a side view of a key blank.

FIG. 13 is a side view of a master key.

DETAILED DESCRIPTION OF THE INVENTION

Figure 1:
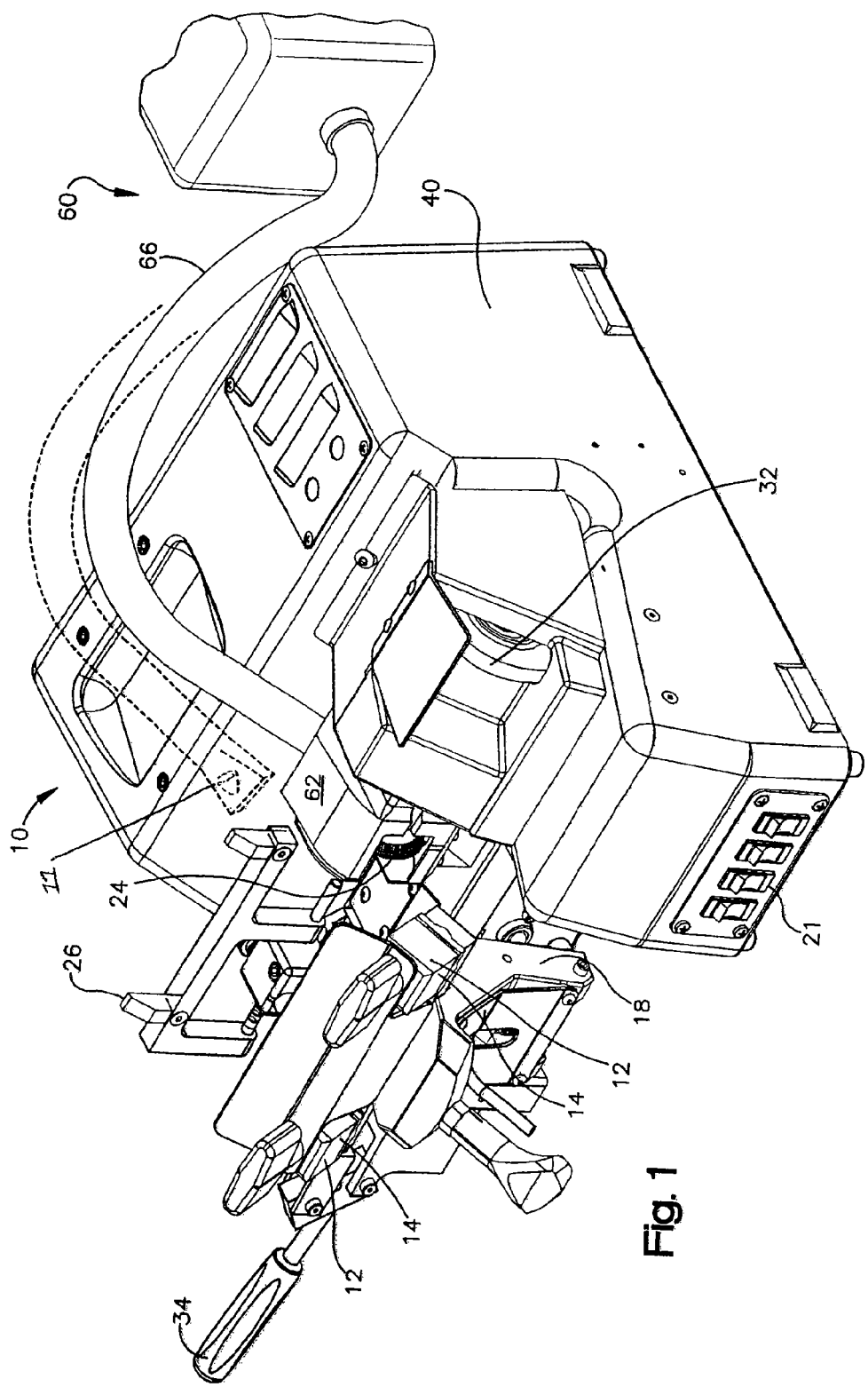
FIG. 1 is a perspective view of the key cutting machine of the present invention.

The key cutting machine of the present invention, generally designated as 10, is shown in the accompanying drawings. The key cutting machine 10 as described herein has numerous features or improvements, each of which are believed to be independently novel. Therefore, while the preferred embodiment of the present invention is described as utilizing each of these novel features or improvements in the aggregate, the appended claims should only be limited by the structure described therein and interpreted independently of all other features or improvements described herein. The present description in conjunction with the accompanying drawings should clearly enable one skilled in the art to reproduce the components and function of the key cutting machine. The following description will describe in detail the present invention with reference to the several drawings.

With reference to FIGS. 12 and 13, a brief introduction to key blanks and master keys is as follows. A key blank generally 100 comprises a head 102, a shoulder 104, and a blade 106. Key blanks can also be provided with keyway grooves 108 which are long, narrow, milled-out areas along the sides of the blade 106 that allow the blade 106 to bypass the wards in the keyway. Such keyway grooves 108 may already be cut into a key blank so as to make the key cutting operation more simplified. Therefore, when duplicating a master key, a key blank 100 must be identified as either identical to or similar to the master key. The master key 110 is cut from a key blank 100 and like references are described with like numerals. The master key 110 generally comprises a head 102, a shoulder 104, a blade 106, and a keyway groove 108. However, the master key 110 has a key pattern 112 already cut into the blade 106. The particular key pattern 112 corresponds to the pin and tumbler design of a lock.

Figure 2:
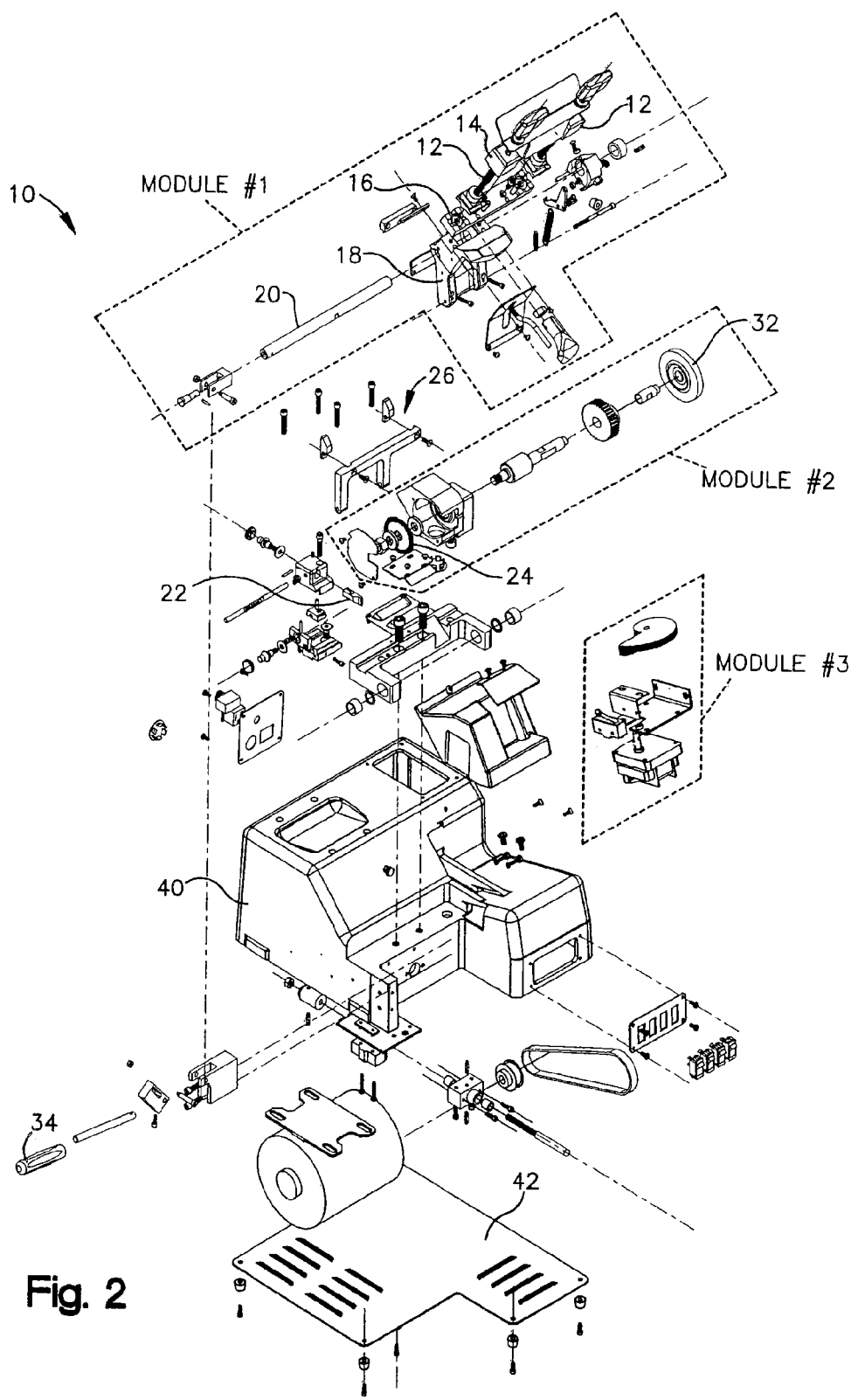
FIG. 2 is an exploded view of the key cutting machine of FIG. 1.
Figure 3:
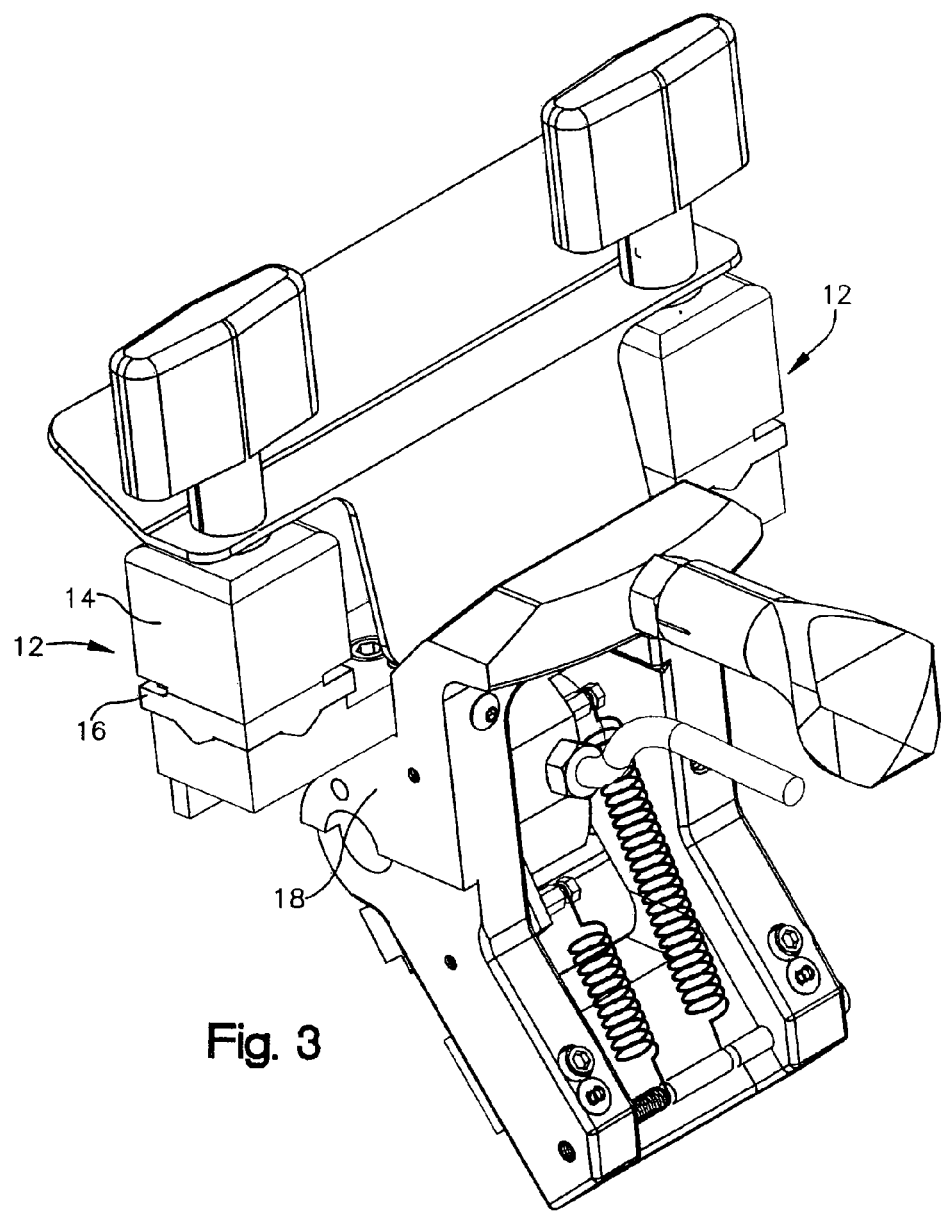
FIG. 3 is a view of the carriage.
Figure 4:
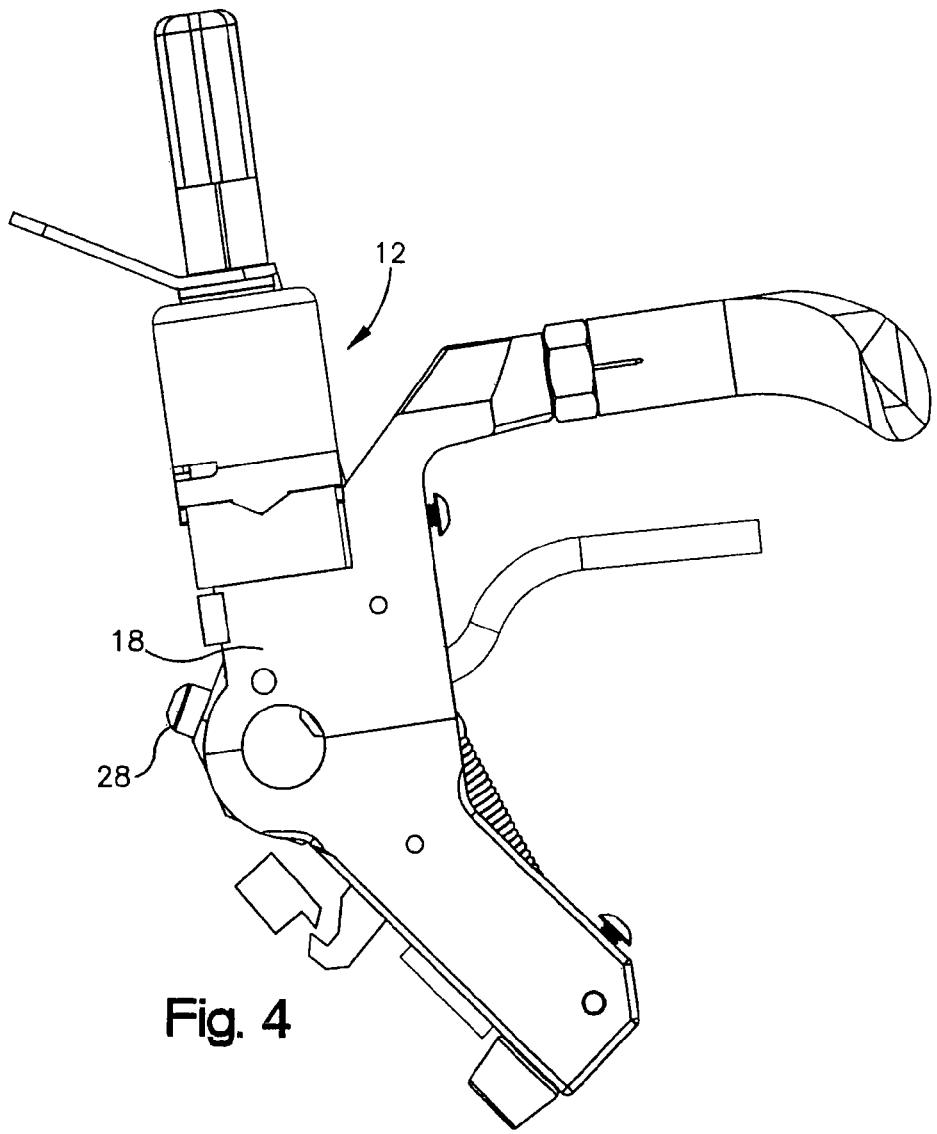
FIG. 4 is a side view of FIG. 3.
Figure 9:
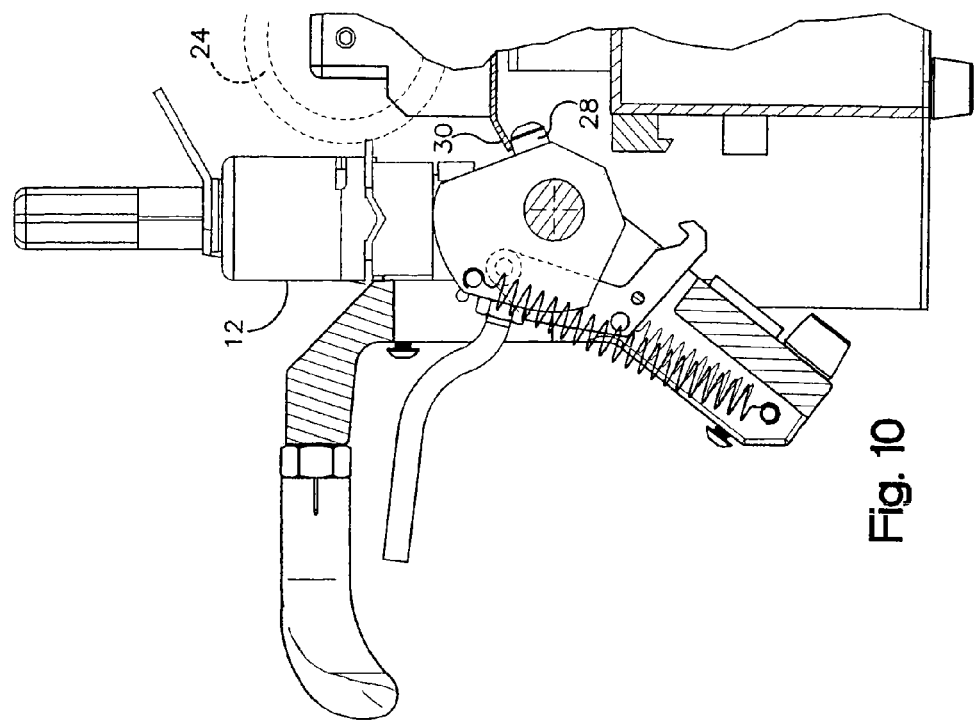
FIG. 9 is a fragmented cross-sectional view of the carriage in an engaged carriage-up cutting position.

With reference to FIGS. 1 and 2, a brief description of the structure of the key cutting machine 10 of the present invention is as follows. An exploded view showing the parts and assembly of the key cutting machine 10 is shown in FIG. 2. The assembled key cutting machine is shown in FIG. 1. The key cutting machine 10 includes a pair of vise grips or clamps 12 having top jaws 14 and bottom jaws 16 which are mounted on a carriage 18. A master key 110 having a key pattern 112 already cut therein is placed within the left-most clamp 12 on the carriage 18 and a key blank 100 awaiting to be cut having an identical keyway groove 108 as the master key 112 is placed in the adjacent clamp 12 on the carriage 18. The gauge fork 26 is used to align the master key 110 and the key blank 100 in the correct and exact orientation within the clamps 12. The carriage 18 is mounted on a carriage rod 20 so that the carriage 18 is moveable longitudinally along the carriage rod 20 and is also moveable radially so that the carriage 18 can be moveable between a carriage down position (FIG. 11) and a carriage up position (FIG. 9). A switch 21 automatically engages the motor when the carriage 18 is moved toward a carriage up position.

Figure 6:
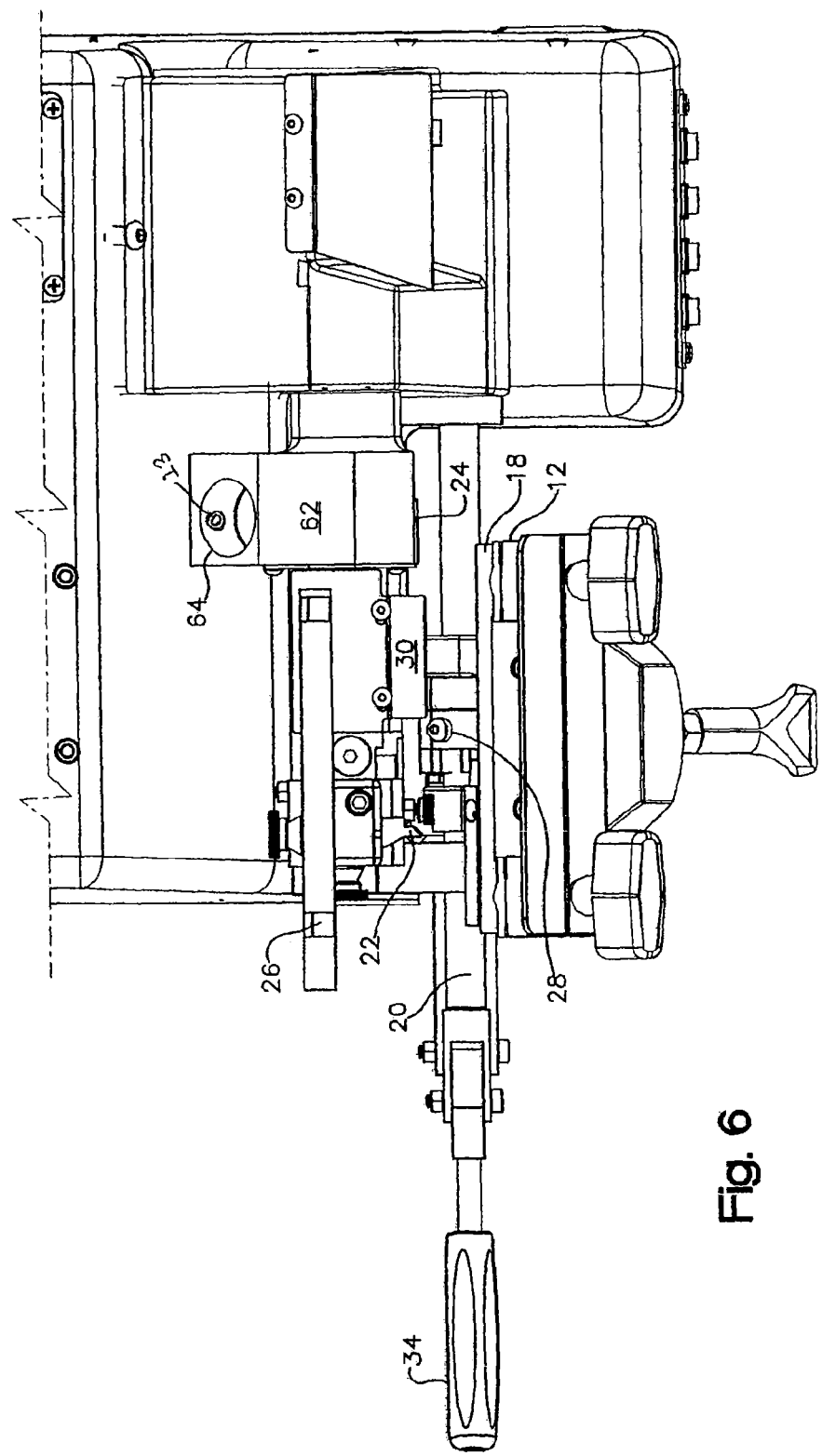
FIG. 6 is a partial top view of the key cutting machine in the carriage-down position.

As best shown in FIG. 6, the key cutting machine 10 includes a stylus or tracer 22 that faces the key pattern 112 of the mounted master key 110. The cutting wheel 24 faces the mounted key blank 100. Therefore, as the carriage 18 is pivotally and linearly movable along the longitudinal carriage rod 20 and the master key 110 is pressed against the tracer 22, the key blank 100 is likewise pressed against the cutting wheel 24 to the same depth as permitted by the tracer 22 against the master key 110 and the carriage 18 is longitudinally moveable to cut the key pattern 112 from the master key 110 into the key blade 106 of the key blank 100.

A feature or improvement of the key cutting machine 10 of the present invention is that the key cutting machine 10 is operable in three modes: automatic, semi-automatic, and manual. Therefore, with the master key 110 and key blank 100 held within the jaws 12 which are mounted on the carriage 18, the carriage 18 is permitted to move relative to the key cutting machine 10 in three modes.

Figure 7:
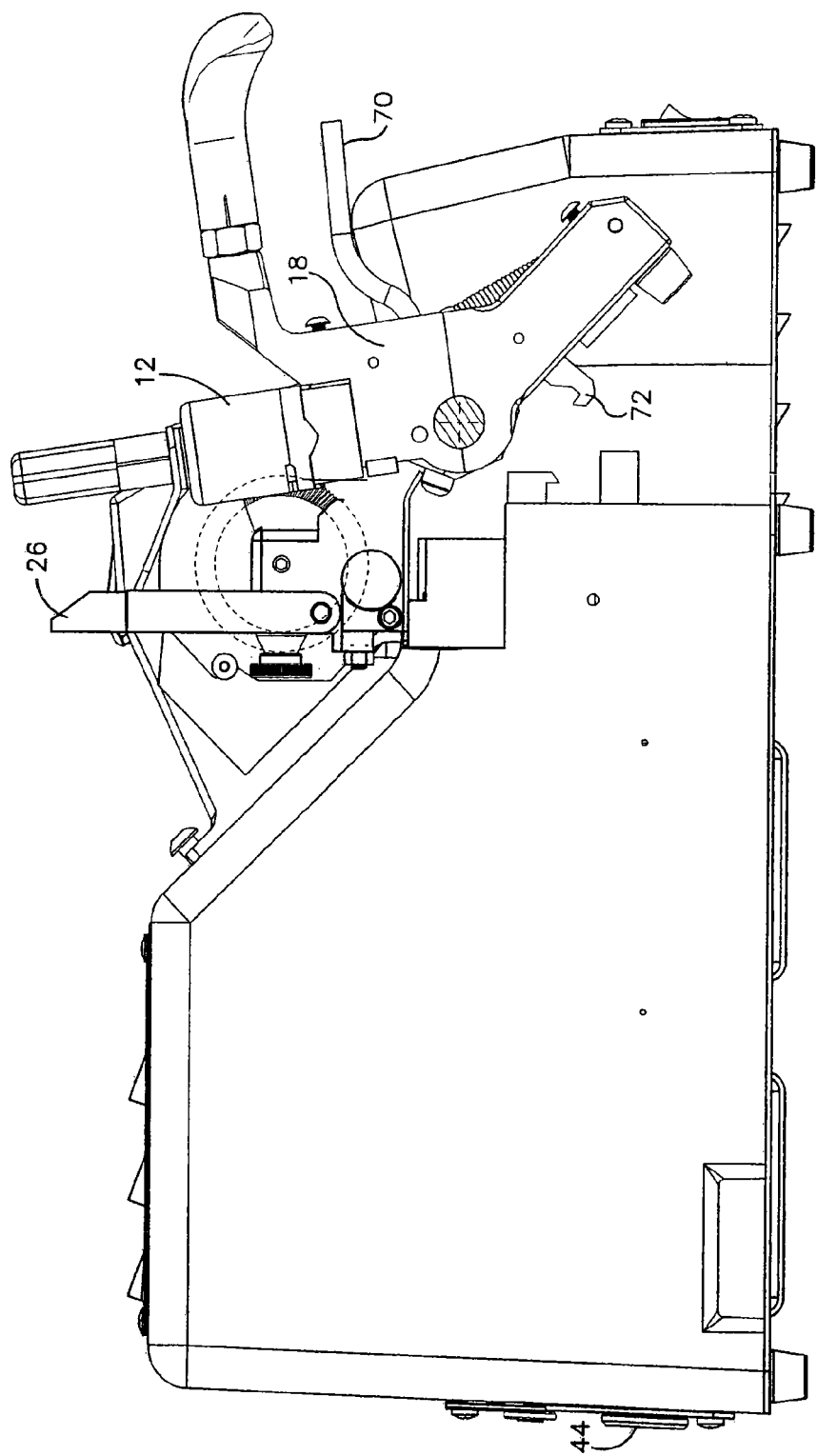
FIG. 7 is a left side cross-sectional view of the key cutting machine in an engaged carriage-up position.
Figure 8:
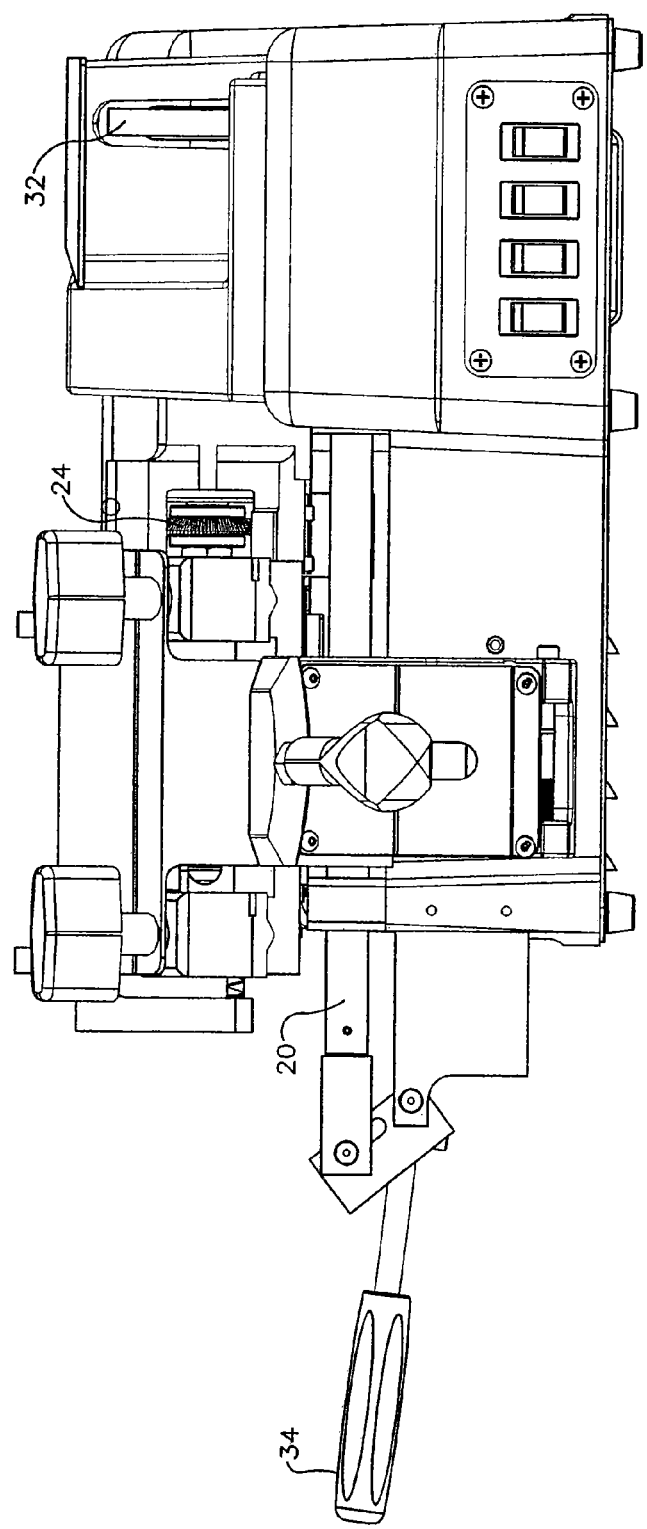
FIG. 8 is a front view of the key cutting machine of FIG. 7.
Figure 10:
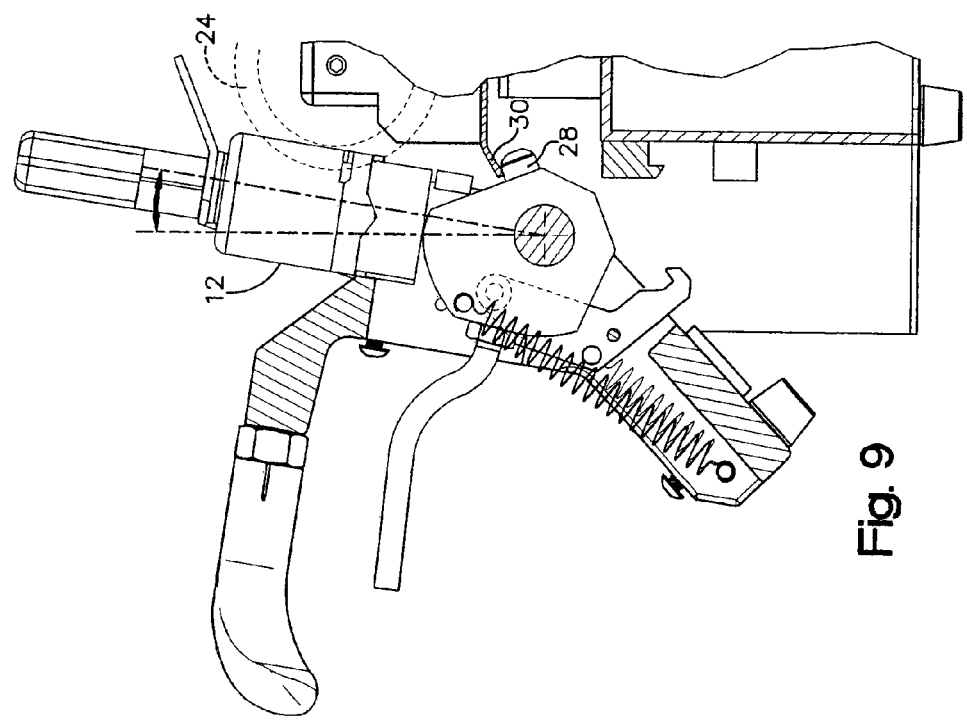
FIG. 10 is a view of the carriage of FIG. 9 in its engaged carriage-up position flexed away from the cutting position.

To operate the key cutting machine 10 in an automatic mode, the master key 110 and key blank 100 are placed in the appropriate jaws 12. The gauge fork 26 is used to verify the proper position and alignment of the master key 110 and key blank 100 and then rotated to an out of the way position as shown in FIG. 7. The carriage 18 is then rotated to a carriage up position (FIG. 5) and the carriage 18 is held against the machine 10 by a roller bearing-plate configuration. As best shown in FIG. 6, a roller bearing 28 is mounted to the carriage 18. With the carriage 18 in a carriage up position (FIG. 7), the roller bearing 28 is spring biased into engagement and under the guide plate 30. With the roller bearing 28 engaged under the guide plate 30 (as shown in FIGS. 7, 9 and 10), the carriage 18 is still moveable longitudinally along the carriage rod 20 while the carriage 18 is spring biased toward the cutting wheel 24 (as shown in FIG. 9). However, the carriage 18 can still be partially rotated away from the cutting wheel 24 against the spring bias when required while in the carriage-up engaged position (as shown in FIG. 10).

After the carriage 18 is set in a carriage up position and the roller bearing 28 engages the guide plate 30, the carriage 18 is moved along the carriage rod 20 to a position where the tracer 22 engages the master key 110 adjacent the head 102. With the carriage 18 being spring biased against the cutting wheel 24, when the carriage 18 is moved longitudinally to the left, the tracer 22 engages the pattern 112 in the master key 110 and the cutting wheel 24 cuts the identical pattern into the key blank 100. With the carriage 18 in the carriage-up master key and key blank aligned position, the machine 10 is turned on and the autocycle button is pushed thereby engaging the automatic cycle. Without input from the user, the motor draws the carriage 18 to the left and the key pattern 112 of the master key 110 is cut into the blade 106 of the key blank 100. When the carriage 18 gets to a position at the end of the cutting process, the roller bearing 28 will extend beyond and disengage from the guide plate 30 and allow the carriage 18 to fall to a carriage down position as shown in FIG. 6. During such a fall to the carriage down position, the rotational switch automatically turns the cutting wheel 24 off. The newly cut key blank is then removed from the jaw and buffed in the brush 32.

Figure 5:
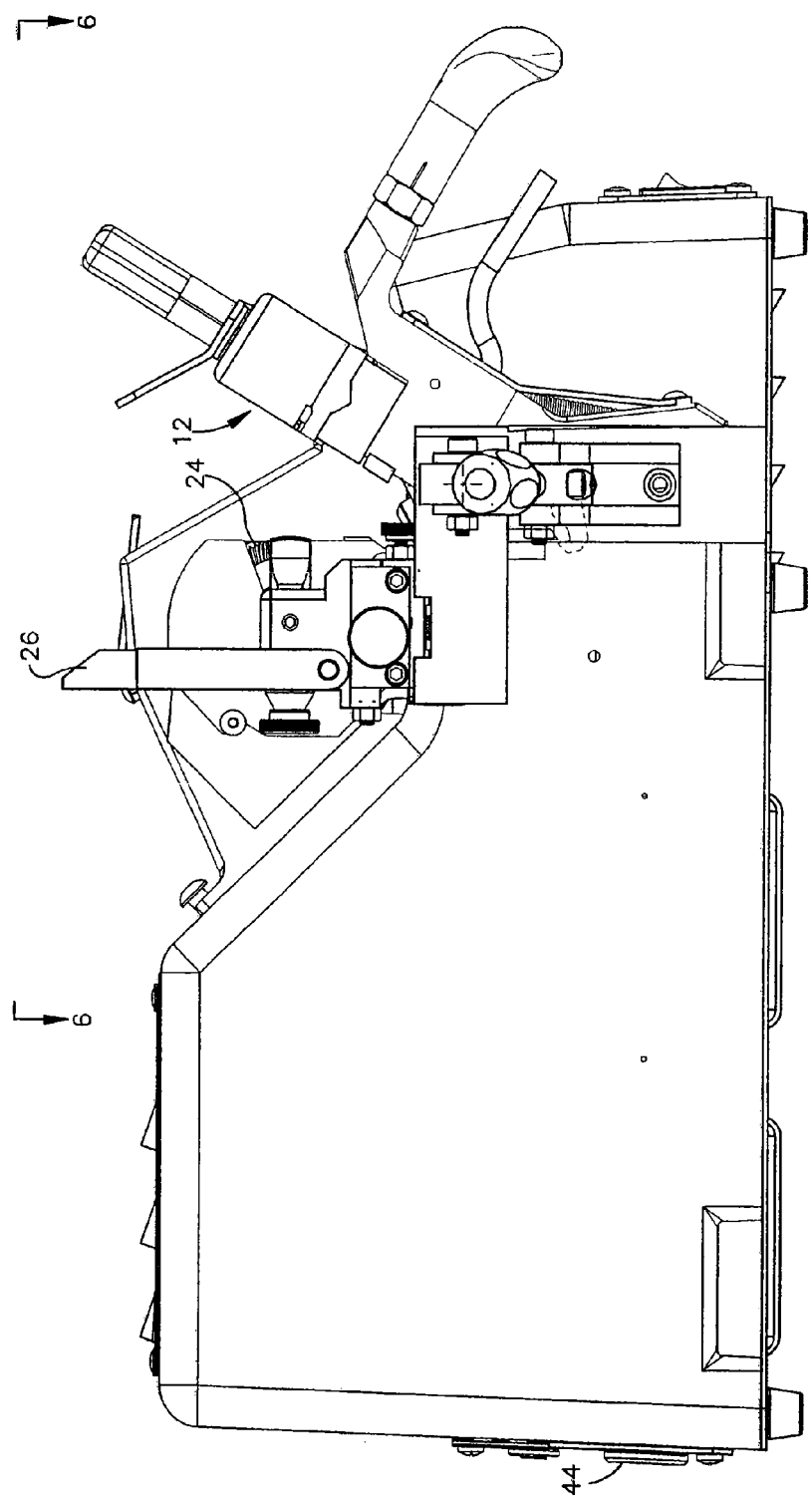
FIG. 5 is a left side view of the key cutting machine of FIG. 1.

The operation of the key cutting machine 10 in a manual mode is identical to that of the automatic mode except that the automatic switch is not engaged so as to run the carriage 18 automatically. The master key 110 and key blank 100 are placed in the appropriate jaws 12. The gauge fork 26 is used to verify the proper position and alignment of the master key 110 and key blank 100 and then rotated to an out of the way position. The carriage 18 is then rotated to a carriage up position and the carriage 18 is held against the machine 10 by the engagement between the roller bearing 28 and guide plate 30. Preferably, the carriage 18 is moved along the carriage rod 20 to a position where the tracer 22 engages the master key 110 adjacent the head 102, although the carriage 18 can be moved at any position therealong. With the carriage 18 being spring biased against the cutting wheel 24, when the carriage 18 is moved longitudinally to the left by the user through pivoting of the handle 34, the tracer 22 engages the pattern 112 in the master key 110 and the cutting wheel 24 cuts the identical pattern into the key blank 100. The user can move the carriage 18 at will longitudinally and the master key pattern 112 is cut into the key blank 100. When the cutting process is complete, the user simply moves the carriage 18 to a position at the end of the cutting process so that the roller bearing 28 will extend beyond the guide plate 30 so that the carriage 18 falls to a carriage down position as shown in FIG. 5. During such a fall to the carriage down position, the rotational switch automatically turns the cutting wheel 24 off. The newly cut key blank is then removed from the jaw 12 and buffed in the brush 32.

The operation of the key cutting machine 10 in a semi-automatic mode is identical to that of the automatic mode except that at the end of the automatic cycle when the roller bearing 28 disengages from the guide plate 30, the user can take control of the carriage 18 and move the carriage 18 to a carriage up position and continue the cutting process. Like all modes, once the roller bearing 28 disengages the guide plate 30, the user can move the carriage 18 to the carriage up position and not engage the roller bearing 28 and guide plate 30 so that the user can manually move the carriage 18 to continue the cutting process. As the carriage 18 approaches the carriage up position, the rotational switch engages and the cutting wheel 24 is actuated so that the user can manually perform the key cutting operation.

To ensure that the key blank 100 and master key 110 are positioned properly within the key cutting machine 10, the key cutting machine 10 includes an additional improvement or feature wherein the jaws 12 are selectable for properly clamping and holding numerous types of keys therein. In particular, the upper and lower jaws 14, 16 are rotatable to provide separate clamping areas therebetween to accommodate different types of master keys and key blanks for accommodating key width and particular groove structures. Therefore, depending upon the type of master key and key blank being used, the jaws 12 of the key cutting machine 10 must be rotated to accommodate particular key configurations. These such jaw positions can be color coded or identified to assist the operator in identifying the proper jaws to use with particular master key and key blank configurations.

Another improvement or feature of the present invention is a novel assembly to prevent key cutting shavings from interfering with the performance of the key cutting machine 10. The key cutting machine 10 of the present invention includes a housing 40 that mounts over a bottom cover 42. However, the components of the key cutting machine 10 are not mounted on the bottom cover 42 as in most other key cutting machines. With the present invention, all motors, electrical wiring, and switches are mounted to the underside of the cast housing 40 and above the base 42 so that any metal shavings and debris entering the housing 40 will fall past the internal components and collect on the bottom cover 42. Such a configuration will prevent such shavings and debris from interfering with the operation of the components.

Yet another improvement or feature of the present invention is that the construction of major components is modular in form. As shown in the accompanying drawings, the key cutting machine includes three distinct modules that are assembled and mounted to the exterior housing. Should any of these modules fail, or components of the modules, the entire machine does not have to be removed or disassembled. Preferably, a module can be easily replaced by a technician so as to minimize down time of the machine. Such modularity of components mounted directly on the housing permits cost effective maintenance and repair of the key cutting machine and ease of access and repair to specific components at the field level. Modules 1, 2 and 3 are shown in FIG. 2.

Still another improvement or feature of the key cutting machine 10 is the utilization of a vacuum assembly 60. And while the vacuum assembly 60 could be integrally formed with the key cutting machine 10, the preferred embodiment utilizes a removable vacuum system 60 capable of being connected to the key cutting machine 10. Specifically, the removable vacuum system 60 has a quick disconnect element permitting selectable connection and disconnection of the vacuum tube. In an embodiment, the quick disconnect element consists of a protrusion 11 capable of being received within an aperture 13 of the vacuum port. The protrusion 11 and aperture 13 shown in the figures are schematically shown only and do not represent any particular precise location or exact shape of the protrusion and aperture.

As shown best in FIG. 1, a vacuum system 60 can be mounted on or near the key cutting machine 10 and plugged into a power supply outlet, preferably the power supply outlet 44 as shown in FIG. 5. A housing 62 over the cutting wheel 24 prevents access to the cutting wheel 24 to prevent accidental contact therewith. A vacuum port 64 is located within the housing 62 so as to provide vacuum communication between the interior of the housing 62 and the vacuum system 60. The vacuum tube 66 is removeably connected to the vacuum port 64 so that when the vacuum tube 66 is connected to the vacuum port 64, the vacuum 60 is capable of collecting key shavings from within the housing 62 created during a key cutting operation. When the vacuum tube 66 is disconnected from the vacuum port 64, the vacuum tube 66 can be used as a hand-held vacuum wand to vacuum metal shavings from the key cutting area and surrounding area for general clean-up. Preferably the vacuum 60 is actuated when the cutting wheel 24 is actuated.

It is also anticipated that the key cutting machine 10 of the present invention is also capable of connection to a computer or other mechanism (not shown) so as to interface with a key identification system as disclosed in the incorporated patent application to make the key cutting process a totally automatic identification, transfer, and cutting system. Such a fully automated system can utilize a robotic arm or other transfer device that would retrieve a key blank identified by the identification system and place that key blank into the locking jaws 12 so that a user would not have to operate the key cutting machine 10 or transfer the key blank to the key cutting machine 10.

A further improvement or feature of the key cutting machine 10 is a carriage and rotating arm having an improved lever latch and carriage locking mechanism as shown in FIGS. 5, 7 and 11. The locking mechanism locks the carriage 18 and stops the cutter after the key is cut. The user is then required to pull the trigger 70 to release the latching mechanism 72 on the carriage 18 to permit movement of the carriage 18 and activation of the cutting wheel 24 so as not to accidentally activate the cutting wheel 24.

The invention claimed is:

1. A key cutting machine comprising:
a housing;
a carriage supported on said housing, said carriage configured to be pivoted between a carriage up position and a carriage down position;
a roller bearing of the carriage engageable with and biased towards an underside of a guide plate while said carriage is in a carriage up position wherein the carriage is linearly movable relative to said housing;
a key clamp connected to said carriage;
a key cutting element located at least partially within said housing; and
a motor connected to and capable of driving said carriage.

2. The key cutting machine of claim 1 further comprising at least one power supply outlet integral therewith for electrically connecting an external electrical device thereto.

3. The key cutting machine of claim 2 wherein said at least one power supply outlet is activated when said key cutting element is activated.

4. The key cutting machine of claim 3 wherein said external electrical device is a vacuum device having a vacuum tube capable of removable connection to a vacuum port.

5. The key cutting machine of claim 1, wherein the roller bearing is configured to move beyond and disengage from the guide plate and allow the carriage to pivot to said carriage down position.

6. The key cutting machine of claim 5, wherein as the carriage pivots to said carriage down position, a rotational switch turns off the key cutting element.

7. The key cutting machine of claim 1, wherein the housing further comprises a carriage rod, and wherein said carriage is mounted to said carriage rod.

8. The key cutting machine of claim 7, wherein said carriage is moveable longitudinally along the carriage rod.

9. The key cutting machine of claim 8, wherein the carriage is moveable along the carriage rod to a position where a tracer engages a master key mounted to said carriage.

10. The key cutting machine of claim 1, further comprising a vacuum tube.

11. The key cutting machine of claim 1, further comprising a latching mechanism connected to said carriage to latch said carriage in said carriage down position.

12. The key cutting machine of claim 11, further comprising a trigger supported on said carriage to release the latching mechanism to permit movement of said carriage.

13. The key cutting machine of claim 11, further comprising a trigger supported on said carriage to release the latching mechanism to permit activation of said key cutting element.

\* \* \* \* \*